United States Patent
Taets

(10) Patent No.: US 9,617,443 B2
(45) Date of Patent: *Apr. 11, 2017

(54) METHOD FOR THE PREPARATION OF STABLE EMULSIONS OF POLYISOBUTENE

(71) Applicant: EMULCO LABORATORIES C.V.B.A., Ghent (BE)

(72) Inventor: Lieve Taets, Ghent (BE)

(73) Assignee: EMULCO LABORATORIES C.V.B.A., Gent (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/414,681

(22) PCT Filed: Jul. 15, 2013

(86) PCT No.: PCT/EP2013/064908
§ 371 (c)(1),
(2) Date: Jan. 13, 2015

(87) PCT Pub. No.: WO2014/012888
PCT Pub. Date: Jan. 23, 2014

(65) Prior Publication Data
US 2015/0203637 A1  Jul. 23, 2015

(30) Foreign Application Priority Data

Jul. 16, 2012 (BE) .................................. 2012/0499
Feb. 12, 2013 (EP) .................................. 13154995

(51) Int. Cl.
C08J 3/09 (2006.01)
C08K 5/07 (2006.01)
C09D 123/22 (2006.01)
C08J 3/03 (2006.01)
C08L 23/22 (2006.01)

(52) U.S. Cl.
CPC .............. C09D 123/22 (2013.01); C08J 3/03 (2013.01); C08L 23/22 (2013.01); C08J 2323/18 (2013.01); C08J 2323/22 (2013.01); C08J 2491/08 (2013.01)

(58) Field of Classification Search
None
See application file for complete search history.

(56) References Cited

U.S. PATENT DOCUMENTS 3,579,461 A * 5/1971 Glaub ................... B01F 3/0807
106/271
4,171,295 A * 10/1979 Frese .................... C08L 95/005
524/501

(Continued)

Primary Examiner — Peter A Salamon
(74) Attorney, Agent, or Firm — Knobbe, Martens, Olson & Bear LLP

(57) ABSTRACT

The invention relates to a method for preparing a stable and thin liquid polyisobutene emulsion comprising the steps of i) heating a polyisobutene polymer, optionally mixing said polyisobutene polymer with a wax and/or oil, thereby obtaining a pre-mix, ii) mixing said pre-mix in water containing one or more surfactants in a concentration of the surfactant of maximum 5% wt. at a controlled flow rate, which flow rate is sufficiently slow to form particles of the pre-mix, thereby obtaining a pre-emulsion, and iii) homogenizing said pre-emulsion, thereby obtaining said polyisobutene emulsion with an average particle size of at maximum 100 μm.

14 Claims, 4 Drawing Sheets

(56) References Cited

U.S. PATENT DOCUMENTS

| | | | | |
|---|---|---|---|---|
| 4,468,254 | A * | 8/1984 | Yokoyama | C08L 91/08 106/271 |
| 4,594,109 | A * | 6/1986 | Kawabata | C09D 5/008 106/271 |
| 5,346,943 | A * | 9/1994 | Khungar | C08K 5/0008 106/285 |
| 5,421,866 | A * | 6/1995 | Stark-Kasley | C04B 41/009 106/2 |
| 5,743,949 | A * | 4/1998 | Kainz | C08J 3/03 106/131.1 |
| 7,153,516 | B2 * | 12/2006 | Bowen-Leaver | A61K 8/042 424/401 |
| 7,767,748 | B2 * | 8/2010 | Leyrer | C08F 2/24 524/459 |
| 2003/0185782 | A1 * | 10/2003 | Auguste | A61K 8/06 424/70.11 |
| 2004/0154216 | A1 * | 8/2004 | Huffer | B01F 17/0028 44/385 |
| 2008/0274073 | A1 * | 11/2008 | Bell | C08F 222/06 424/78.02 |
| 2009/0197105 | A1 * | 8/2009 | Buchholz | B27N 1/006 428/473.5 |
| 2010/0251932 | A1 * | 10/2010 | Sujeeth | A61K 8/445 106/31.13 |
| 2011/0275738 | A1 * | 11/2011 | Engel | B01F 3/0811 523/351 |
| 2013/0059927 | A1 * | 3/2013 | Boeckh | C08L 23/22 514/772.5 |
| 2015/0175791 | A1 | 6/2015 | Taets | |
| 2015/0203637 | A1 * | 7/2015 | Taets | C08J 3/09 523/122 |

* cited by examiner

METHOD FOR THE PREPARATION OF STABLE EMULSIONS OF POLYISOBUTENE

CROSS-REFERENCE TO RELATED APPLICATIONS

This application is the U.S. National Phase under 35 U.S.C. §371 of International Application PCT/EP2013/064908, filed Jul. 15, 2013, which claims priority to BE 2012/0499, filed Jul. 16, 2012 and EP 13154996.6, filed Feb. 12, 2013.

TECHNICAL FIELD

The invention relates to a method for the preparation of stable emulsions of polyisobutene. In this disclosure, a method for the preparation of stable emulsions of polyisobutene with an average particle size of at maximum 100 µm are reported.

INTRODUCTION

Emulsions or dispersion can be defined as a mixture of two or more non-mixable fluids. The preparation of a dispersion or of a mixture comprises the mixing of two non-mixable fluids, whereby one of these fluids (named "dispersed phase") is dispersed as fine drops in the other fluid (named "dispersant phase"). Emulsions are obtained during an emulsification process whereby a homogeneous mixture is obtained by using a surfactant or a surface-active compound.

Many emulsions are already known. However, making emulsions based on polyolefins and especially polyisobutenes, is known to have some difficulties. Firstly, it is very difficult to obtain a stable emulsion. Also, only stable emulsions based on polyisobutene with a low molecular weight are reported. In addition, de presence of a wax or oil is mandatory. Furthermore, also the presence of an additional polymer is required for the synthesis of such emulsions, dramatically increasing the cost price of such emulsions. Finally, a high mass concentration of one or more surfactants is required.

WO 2011 141496 reports on the synthesis of stable emulsions based on polyisobutene. Polyisobutene with low molecular weight is used with a maximum of 10,000 g/mol. Here also, a functionalized polymer is added.

WO 2007 042454 discloses the synthesis of emulsions based on polyisobutene. Hereby, only syntheses in presence of polymer are reported, whereby emulsions based on polyisobutene with a molecular weight lower than 10,000 g/mol are depicted.

However, it is not yet possible to make stable emulsions based on polyisobutene in absence of a polymer. In addition, it is not yet possible to make emulsions of polyisobutene based on polyisobutene with a high molecular weight. Furthermore, only emulsions based on polyisobutene are reported, which are synthesized with high surfactant concentration. Also, no emulsions are reported based on polyisobutene in absence of a wax and/or oil.

Especially the formation of emulsions of polymers with inherent sticky or tacky character is difficult since such polymers are difficult to handle and disperse in an aqueous phase. Some literature articles report on efficient methodologies for handling such polymers.

U.S. Pat. No. 4,357,444 provides in a method wherein rubbery, tacky polymer is mechanically subdivided, the improvement comprising conducting the mechanical subdivision in the presence of fine particles of substantially thermoplastic halogenated polymer. However, this brings the necessity of additional material in the emulsion, therefore strongly affecting the emulsion's final properties.

In addition, the synthesis of polyisobutene emulsions, especially polyisobutene emulsions with high molecular weight polymer, in water with a relatively low water content is not yet fully understood or documented. In general, to achieve a lower water content of an emulsion or reversely a higher polymer content, the person skilled in the art would enhance the amount of surfactant of the emulsion. However, by doing so, this results in an enhanced tackiness and viscosity of the eventually obtained emulsion. A method for the production of polyisobutene emulsions with low water content without the excessive use of surfactant is up to date not yet disclosed.

SUMMARY OF THE INVENTION

In a first aspect, the present invention provides a method for preparing a polyisobutene emulsion comprising the steps of:
  heating a polyisobutene polymer, optionally mixing said polyisobutene polymer with a wax and/or oil, thereby obtaining a pre-mix,
  mixing said pre-mix in water containing one or more surfactants in a concentration of said surfactant of at maximum 5% wt. at a controlled flow rate, which flow rate is sufficiently slow to form particles of the pre-mix, thereby obtaining a pre-emulsion, and
  homogenising said pre-emulsion, thereby obtaining said polyisobutene emulsion with an average particle size of at maximum 100 µm.

Some of the advantages provided by the above described method are that said pre-mix is distributed efficiently in water whereby handling of said pre-mix is much more convenient and mixing is much more efficient. This is especially advantageous in view of the fact that polyisobutene has a high intrinsic tackiness, which impedes suspending such polymers efficiently in water for preparing a high-quality pre-emulsion or emulsion. In addition, the method of mixing provides the advantage that said pre-mix, surfactants and water are mixed in such a way that the mixing process provides an optimal distribution of surfactants at the interphase between pre-mix and water. This allows for a reduced use of surfactants. In addition, the adhesion forces of the resulting emulsion are considerably neutralized resulting in an polyisobutene emulsion with reduced tackiness. Eventually, such an emulsion provides good flowing properties and comparably low viscosities. Furthermore, the described method provides the advantage that the addition of said pre-mix to water comprising a surfactant is sufficiently slow to avoid the formation of an excessive amount of foam. Finally, the current invention also provides a method for the preparation of a polyisobutene emulsion with an average particle size smaller than 100 µm, thereby providing an emulsion with good stability, good flowing parameters and relatively low viscosity and tackiness.

DETAILED DESCRIPTION OF THE INVENTION

Figure 1:
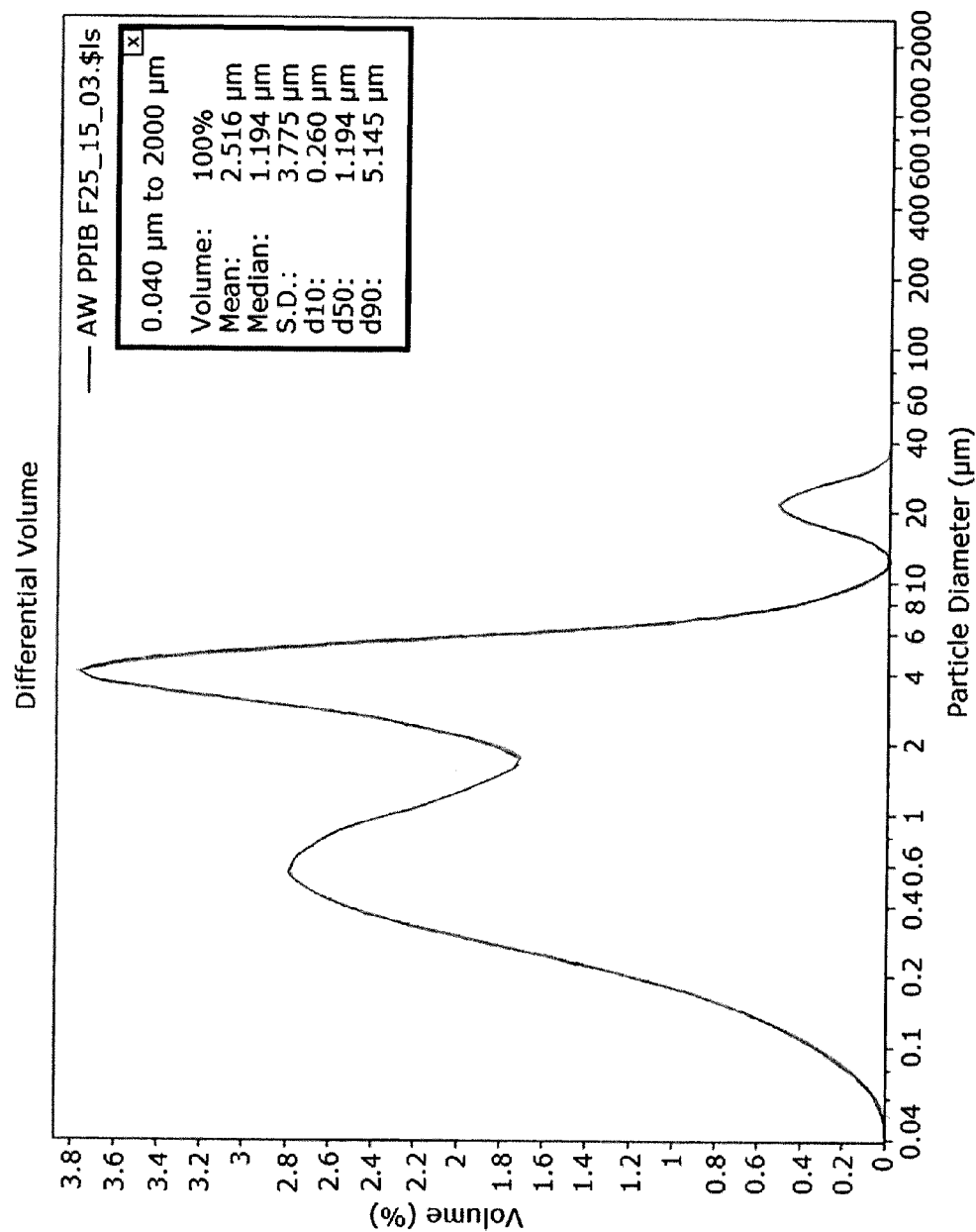
FIG. 1 depicts the particle size distribution of an emulsion prepared according to example 1.
Figure 2:
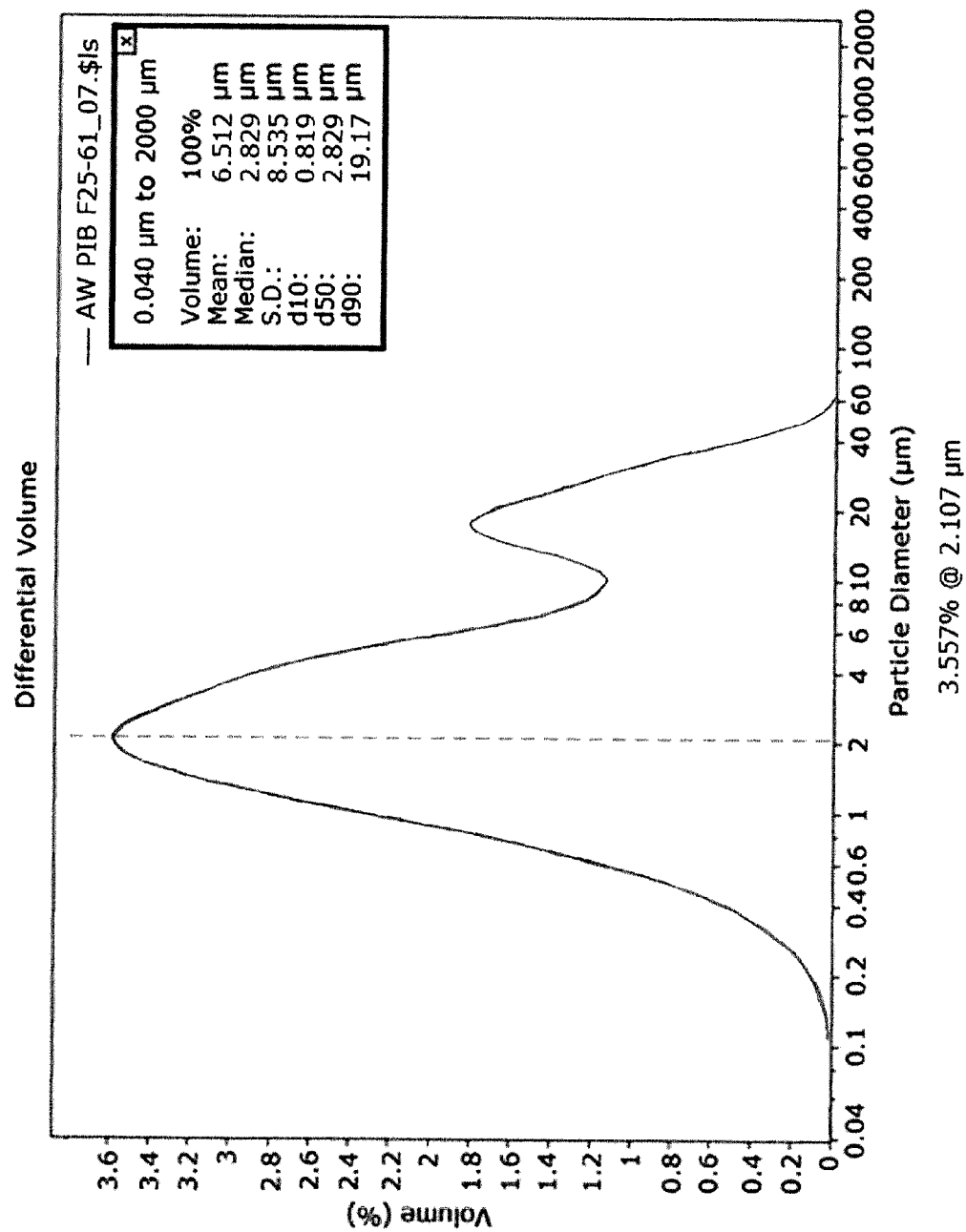
FIG. 2 depicts the particle size distribution of an emulsion prepared according to example 2.
Figure 3:
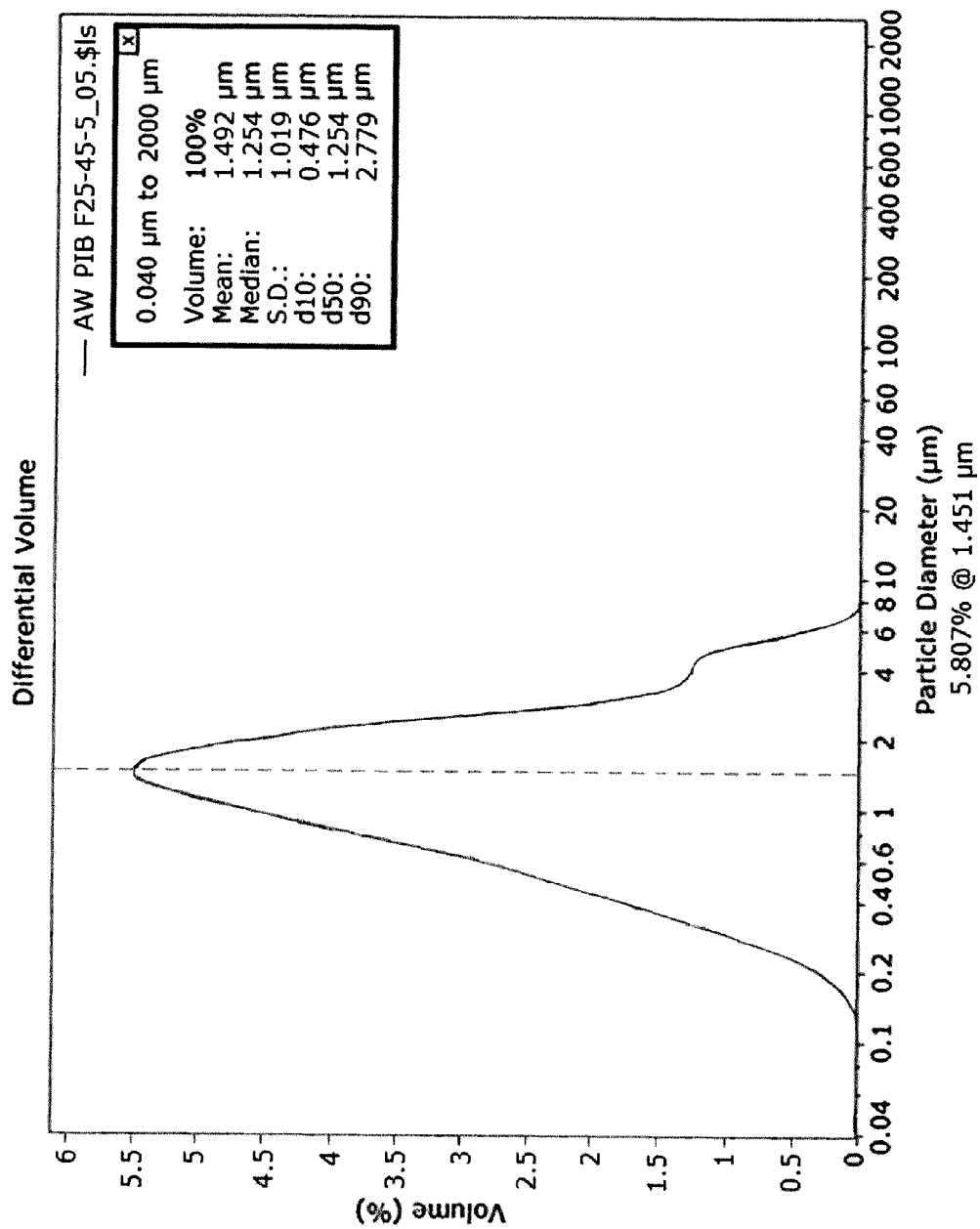
FIG. 3 depicts the particle size distribution of an emulsion prepared according to example 3.
Figure 4:
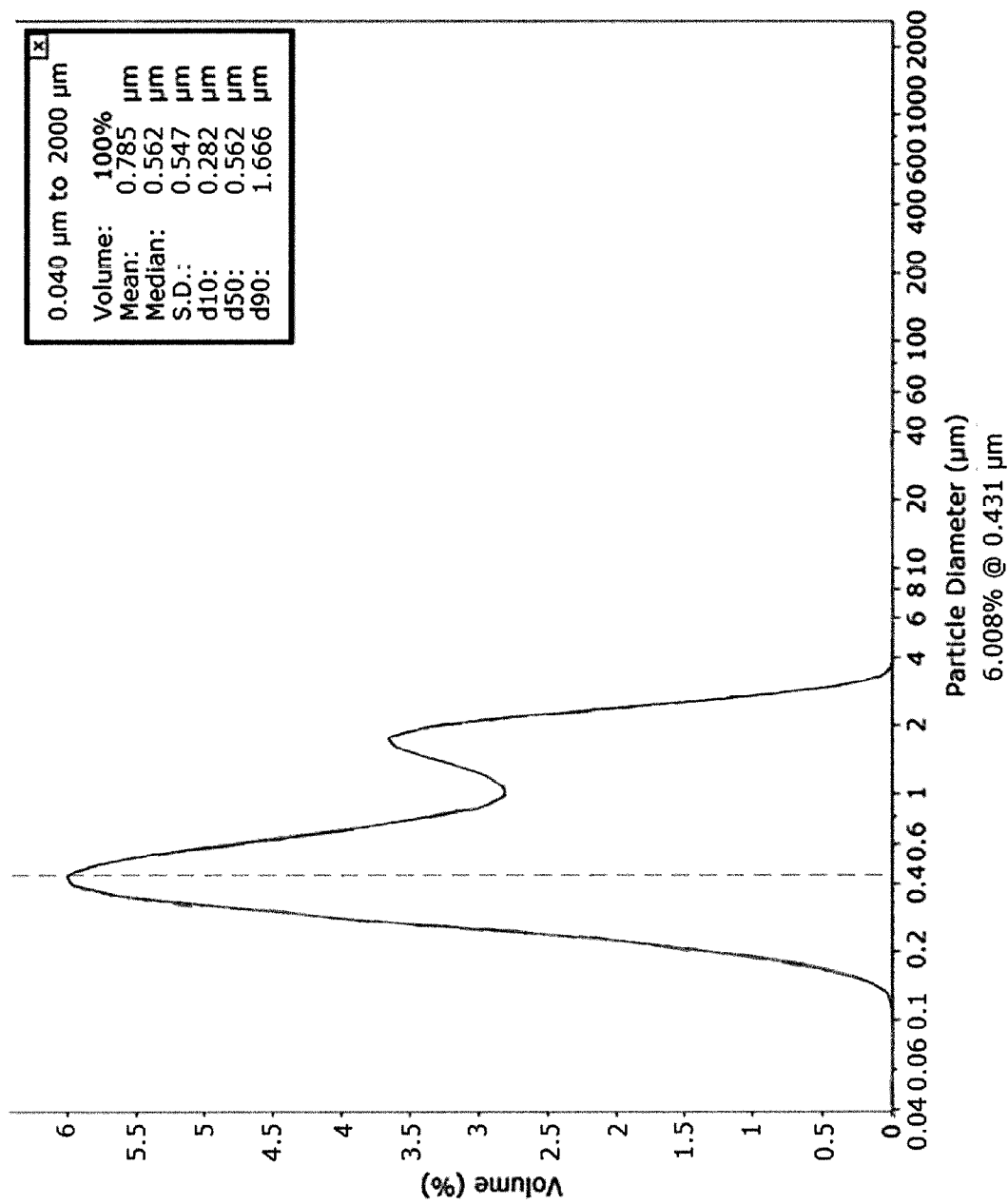
FIG. 4 depicts the particle size distribution of an emulsion prepared according to example 4.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "water" is to be understood also as "watery phase" or "aqueous phase," optionally including dissolved products or additives therein.

The expression "a range of x % of a predetermined value" is to be understood as the range of said predetermined value−x % to said predetermined value+x %.

The recitation of numerical ranges by endpoints includes all numbers and fractions subsumed within that range, as well as the recited endpoints. All percentages are to be understood as percentage by weight and are abbreviated as "% wt.", unless otherwise defined or unless a different meaning is obvious to the person skilled in the art from its use and in the context wherein it is used.

Polyisobutene is a polymer based on isobutene as fundamental compound. Polyisobutene exists in different molecular weights. Low molecular weight is understood as a molecular weight up to 2500 g/mol, medium molecular weight is understood from 2501 g/mol to 100000 g/mol and high molecular weight is understood as 100001 g/mol to 500000 g/mol.

Polyisobutene with various molecular weights are known. Examples of polyisobutene produced by BASF are: with low molecular weight: Glissopal®V types, such as Glissopal®V190, Glissopal®V 500, Glissopal®V 640, Glissopal®V 1500; with medium molecular weight: Oppanol®B types, such as Oppanol®B 10, Oppanol®B 11, Oppanol®B 12, Oppanol®B 13, Oppanol®B 14, Oppanol®B 15; with a high molecular weight: Oppanol®B types, such as Oppanol®B 30, Oppanol®B 50, Oppanol®B 80. Examples produced by ExxonMobil Chemical Company are Vistanec LM-MH, LM-MS and LM-H.

Polyisobutene can be used as one type of polyisobutene or as a blend of different types of polyisobutene.

The proportion of the polyisobutene is preferably between 0.5% wt. and 65% wt., more preferably between 10% wt. and 65% wt., even more preferably between 25% wt. and 65% wt., most preferably between 30% wt. and 65% wt. of the total mass of said emulsion.

Generally it can be assumed that the emulsification process for the synthesis of an emulsion consists of the following steps: a pre-mix step of the individual components to form a pre-emulsion and the effective emulsification. To achieve a certain fineness of the droplets, several options are known in the state of the art. Potentially useful systems include the use of movable rotating agitators, rotor-stator devices, pressure relief devices, homogenizers and other blasting devices, ultrasonic devices and membrane emulsification devices.

The most used are the pressure homogenizers devices. The principle of this is the pre-pressurization of the pre-emulsion or dispersion, followed by a forceful pressure release, thus the mechanical energy is transferred to the pre-dispersion. A commonly used system according to such well-known state of the art comprises a reaction vessel and a high-pressure homogenizer such as a Gaulin 15MR of the APV Homogenizer Group. The reaction is preferentially carried out with a heating and cooling system. The necessary components are brought together in the reaction vessel, after which the mixture is mixed and heated to a certain temperature. A high temperature will normally result in smaller average particle size of the dispersion phase in the final emulsion. While doing so, the melting points and flash points of the various components should be taken into account.

Once the desired temperature has been reached, the mixture is sent through a homogenizer. Use of a high pressure homogenizer ensures a reduction in the average particle size of the components of the dispersant phase, whereby the applied pressure can range within the scope from a few hundred to a thousand bar. This process is well-known in the prior art and, inter alia, cited in U.S. Pat. No. 3,579,461 and U.S. 2009, 0197105. Once the emulsification process is finished, the reaction mixture must be cooled down, preferably to room temperature.

Generally, the particles obtained during the emulsification process will have an average particle size in the range of 100 nm to 100 μm, depending on the homogenisation conditions and on the size of the molecular weight of the polyisobutenes. Generally it can be stated that the smaller the average particle size, the more stable the emulsion.

In a first aspect, the present invention provides a method for preparing a polyisobutene emulsion comprising the steps of:
  heating a polyisobutene polymer, optionally mixing said polyisobutene polymer with a wax and/or oil, thereby obtaining a pre-mix,
  mixing said pre-mix in water containing one or more surfactants in a concentration of said surfactant of at maximum 5% wt. at a controlled flow rate, which flow rate is sufficiently slow to form particles of the pre-mix, thereby obtaining a pre-emulsion, and
  homogenising said pre-emulsion, thereby obtaining said polyisobutene emulsion with an average particle size of at maximum 100 μm.

Some of the advantages provided by the above described method are that said pre-mix is distributed efficiently in water whereby handling of said pre-mix is much more convenient and mixing is much more efficient. This is especially advantageous in view of the fact that polyisobutene has a high intrinsic tackiness, which impedes suspending such polymers efficiently in water for preparing a high-quality pre-emulsion or emulsion. In addition, the method of mixing provides the advantage that said pre-mix, surfactants and water are mixed in such a way that the mixing process provides an optimal distribution of surfactants at the interphase between pre-mix and water. This allows for a reduced use of surfactants. In addition, the adhesion forces of the resulting emulsion are considerably neutralized resulting in an polyisobutene emulsion with reduced tackiness. Eventually, such an emulsion provides good flowing properties and comparably low viscosities. Furthermore, the described method provides the advantage that the addition of said pre-mix to water comprising a surfactant is sufficiently slow to avoid the formation of an excessive amount of foam.

In a preferred embodiment, the present invention provides a method for preparing a polyisobutene emulsion, whereby said emulsion is homogenised in at least one homogenisation phase, thereby obtaining a polyisobutene emulsion with an average particle size between 1 nm and 75 µm.

Preferably, said homogenisation step provides a polyisobutene emulsion with an average particle size of between 1 nm and 75 µm. More preferably, said homogenisation step provides a polyisobutene emulsion with an average particle size of between 10 nm and 65 µm. Even more preferably, said homogenisation step provides a polyisobutene emulsion with an average particle size of between 50 nm and 50 µm. Even more preferably, said homogenisation step provides a polyisobutene emulsion with an average particle size of between 100 nm and 25 µm. Most preferably, said homogenisation step provides a polyisobutene emulsion with an average particle size of 250 nm, 500 nm, 750 nm, 1 µm, 2 µm, 4 µm, 6 µm, 8 µm, 10 µm, 12 µm, 14 µm, 16 µm, 18 µm, 20 µm, 22 µm or 24 µm, or any average size there in between. This is advantageous because said average particle size provides a high stability of said polyisobutene emulsion.

In a more preferred embodiment, low or medium molecular weight polyisobutene is fluid or has a relatively low viscosity upon heating to a temperature substantially above the glass temperature of polyisobutene. Even more preferably, polyisobutene is heated to a temperature around the melting temperature of polyisobutene. Most preferably, polyisobutene is heated above the melting temperature of polyisobutene. Preferably, polyisobutene is heated to a temperature between 50° C. and 350° C., more preferably between 75° C. and 250° C., more preferably between 100° C. and 250° C., more preferably between 110° C. and 200° C., more preferably between 120° C. and 175° C., more preferably between 125° C. and 160° C., most preferably a temperature of 130° C. or 131° C. or 132° C. or 133° C. or 134° C. or 134° C. or 135° C. or 136° C. or 137° C. or 138° C. or 139° C. or 140° C. or 141° C. or 142° C. or 143° C. or 144° C. or 145° C. or 146° C. or 147° C. or 148° C. or 149° C. or 150° C. or 151° C. or 152° C. or 153° C. or 154° C. or 155° C., or any temperature in between. Thereby, polyisobutene is rendered less viscous and fluid, and can be transferred straightforwardly to a wax, an oil, water or a mixture thereof and can thus be homogeneously distributed therein.

In a more preferred embodiment, high molecular weight polyisobutene is cut in small parts of a maximum weight of 500 grams before adding to a liquid medium. More preferably, polyisobutene is cut in parts of a maximum weight of 50 grams. Even more preferably, polyisobutene is cut in parts of a maximum weight of 10 grams. Even more preferably, polyisobutene is cut in parts of a weight between 0.1 gram and 5 grams. Most preferably, polyisobutene is cut in parts of a weight of 0.2 gram, or 0.3 gram, or 0.4 gram, or 0.5 gram, or 0.6 gram, or 0.7 gram, or 0.8 gram, or 0.9 gram, or 1 gram, or 1.2 gram, or 1.4 gram, or 1.6 gram, or 1.8 gram, or 2 grams, or 3 grams, or 4 grams, or any mass there in between. Cutting said polymer in small parts allows for the facile uptake in a wax, an oil, water or a mixture thereof and homogeneous distribution of polyisobutene.

In a more preferred embodiment, high molecular weight polyisobutene is cut in small parts at room temperature by using a milling device, preferably provided with a propeller or a paddle. Use of a paddle or a propeller is advantageous because unlike high shear devices, they have a less dramatic influence on the breaking of the polymer chain, thereby reducing the polymer chain length.

In a more preferred embodiment, the temperature of said pre-mix is optionally adapted before addition to water to a temperature between 25° C. and 100° C., more preferably between 40° C. and 95° C., more preferably between 50° C. and 90° C., more preferably between 60° C. and 85° C., more preferably between 70° C. and 80° C. Most preferably said temperature of said pre-mix is optionally lowered before addition to water to a temperature of 71° C., 72° C., 73° C., 74° C., 75° C., 76° C., 77° C., 78° C., 79° C., or any temperature in between.

Some of the advantages of the above described method is that the average particle size of the polyisobutene emulsion obtained by said method is significantly reduced and that the particle size distribution of said polyisobutene emulsion is relatively low. Thereby, a polyisobutene emulsion with small average particle size and a uniform particle size distribution is obtained, which gives rise to good flowing properties, low tackiness, relatively low viscosities and high stability, as determined by water separation experiments, of said emulsion.

In a preferred embodiment, the present invention provides a method for preparing a polyisobutene emulsion, whereby said polyisobutene polymer is mixed with wax, oil, water or any mixture thereof at a maximum flow rate of 50 grams of polyisobutene per 100 grams of wax, oil, water or any mixture thereof per minute.

In a more preferred embodiment, said pre-mix is added to water at a maximum flow rate of 50 grams of polyisobutene per 100 grams of water per minute. In an even more preferred embodiment, said pre-mix is added to water at a flow rate between 0.01 grams and 50 grams of polyisobutene per 100 grams of water per minute. In an even more preferred embodiment, said pre-mix is added to water at a flow rate between 0.04 grams and 20 grams of polyisobutene per 100 grams of water per minute. In a most preferred embodiment, said pre-mix is added to water at a flow rate between 0.08 grams and 10 grams of polyisobutene per 100 grams of water per minute. Most preferably, said pre-mix is added to water at a flow rate of 0.1 grams, 0.2 grams, 0.4 grams, 0.6 grams, 0.8 grams, 1 gram, 2 grams, 3 grams, 4 grams, 5 grams, 6 grams, 7 grams, 8 grams or 9 grams of polyisobutene per 100 grams of water per minute or any flow rate there in between.

One of the advantages of the above described method is that said polyisobutene is allowed to be dispersed efficiently in said aqueous phase.

In a more preferred embodiment, said pre-mix is added to water which is at a temperature between 25° C. and 100° C., more preferably between 40° C. and 95° C., more preferably between 50° C. and 90° C., more preferably between 60° C. and 85° C., more preferably between 70° C. and 80° C. Most preferably said water has a temperature of 71° C., 72° C., 73° C., 74° C., 75° C., 76° C., 77° C., 78° C., 79° C., or any temperature in between.

One of the advantages of the above described method is that a relatively high temperature of said water allows for the good dispersion of said polyisobutene or composition comprising polyisobutene in said water or aqueous phase and a good dispersion of said surfactant at the interphase between said polyisobutene phase and said aqueous phase. Preferably, the temperature of said water is not excessively high in order not to use to much of energy for warming up said aqueous phase.

In a more preferred embodiment, addition of said pre-mix to water occurs under vigorous rotational stirring of water at a stirring speed between 50 rpm and 2000 rpm, more preferably between 100 rpm and 1500 rpm, more preferably between 200 rpm and 1000 rpm, more preferably between 300 rpm and 700 rpm, more preferably between 350 rpm and 650 rpm. Most preferably, said liquid medium is stirred at a stirring speed of 360 rpm, 380 rpm, 400 rpm, 420 rpm, 440 rpm, 460 rpm, 480 rpm, 500 rpm, 520 rpm, 540 rpm, 560 rpm, 580 rpm, 600 rpm, 620 rpm or 640 rpm.

In a more preferred embodiment, addition of said pre-mix to water occurs under vigorous rotational stirring of water whereby said pre-mix is added to water at any place within a distance of 50% from the centre of said vortex of said stirring water mixture relative to the distance between the centre of said vortex and the wall of the reactor. More preferably, said pre-mix is added to water at any place within a distance of 25% from the centre of said vortex of said stirring water mixture relative to the distance between the centre of said vortex and the wall of the reactor. Most preferably, said pre-mix is added to water at any place within a distance of 10% from the centre of said vortex of said stirring water mixture relative to the distance between the centre of said vortex and the wall of the reactor.

One of the advantages of the above described methods is that polyisobutene is efficiently distributed homogeneously in said aqueous phase, thereby providing a good formation of small particles of polyisobutene phase surrounded by surfactant and as such dispersed in said aqueous phase, thereby providing a highly stable emulsion.

In a more preferred embodiment, addition of said pre-mix to water occurs under vigorous rotational stirring of water whereby said pre-mix is added to water via a channel that debouches into the watery or aqueous phase.

One of the advantages of the above described method is that the amount of air that is sucked in into said mixture or pre-emulsion is reduced significantly. A lower amount of air in said emulsion is known to provide a higher quality of said emulsion.

In a preferred embodiment, the present invention provides a method for preparing a polyisobutene emulsion, wherein said water is comprised in an amount of 0.5% wt. to 75% wt. relative to the total weight of said emulsion.

In a more preferred embodiment, said water is comprised in an amount between 5% wt. to 70% wt. relative to the total weight of said emulsion. More preferably, said water is comprised in an amount between 25% wt. to 65% wt. relative to the total weight of said emulsion. Even more preferably, said water is comprised in an amount between 35% wt. to 60% wt. relative to the total weight of said emulsion. Even more preferably, said water is comprised in an amount between 45% wt. to 55% wt. relative to the total weight of said emulsion. Most preferably, said water is comprised in an amount of 46% wt., 47% wt., 48% wt., 49% wt., 50% wt., 51% wt., 52% wt., 53% wt., 54% wt. or any amount there in between relative to the total weight of said emulsion.

In a preferred embodiment, the present invention provides a method for preparing a polyisobutene emulsion, wherein said one or more surfactants are comprised in a concentration between 0.1% wt. and 5% wt.

In a more preferred embodiment, said pre-mix is added to water comprising one or more surfactants in a concentration of surfactant between 1% wt. and 4% wt. More preferably, said water comprises one or more surfactants in a concentration of surfactant between 2% wt. and 3.5% wt. Most preferably, said water comprises one or more surfactants in a concentration of surfactant of 2% wt., 2.2% wt., 2.4% wt., 2.6% wt., 2.8% wt., 3.0% wt., 3.2% wt. or 3.4% wt., or any amount in between.

Use of a relatively low amount of surfactants provides the advantage that the resulting emulsion is relatively less hydrophilic. Consequently, the resulting emulsion attracts less water, thereby providing a less tacky emulsion. Such emulsion with reduced tackiness is of interest for selected chemical-technical applications.

A surfactant or surface-active compound for the synthesis of emulsions and dispersions is often also termed emulsifier. A surfactant comprises normally a hydrophobic and a hydrophilic part. Thereby, the hydrophobic part comprises normally 4 to 20 carbon atoms, preferably 6 to 19 carbon atoms and even more preferably 8 to 18 carbon atoms.

A wide range of surface-active compounds can be used as emulsifiers. Preferably, the used emulsifier will be selected from the group of anionic, cationic or non-ionic surface-active compounds.

Anionic surface-active compound comprise saponified fatty acids and derivatives of fatty acids with carboxylic groups such as sodium dodecylsulfate (SDS), sodium dodecyl benzene sulfonate, sulfates and sulfonates and abietic acid.

Examples of anionic surfactants are also: carboxylates, sulfonates, sulfo fatty acid methyl esters, sulfates, phosphates.

A carboxylate is a compound which comprises at least one carboxylate group in the molecule. Examples of carboxylates are:
  soaps, such as stearates, oleates, cocoates of alkaline metals or of ammonium, alkanol amines
  ether carboxylates, such as Akypo® RO20, Akypo® RO50, Akypo® RO90

A sulfonate is a compound, that comprises at least one sulfonate group in the molecule. Examples of sulfonates are:
  Alkyl benzene sulfonates, such as Lutensit® A-LBS, Lutensit® A-LBN, Lutensit® A-LBA, Marlon® AS3, Maranil® DBX
  Alkyl naphtalene sulfonates condensed with formaldehyde, lignine sulfonates, such as e.g. Borresperse NA, Tamol NH7519
  Alkyl sulfonates, such as Alscoap OS-14P, BIO-TERGE® AS-40, BIO-TERGE® AS-40 CG, BIO-TERGE® AS-90 Beads, Calimulse® AOS-20, Calimulse® AOS-40, Calsoft® AOS-40, Colonial® AOS-40, Elfan® OS 46, Ifrapon® AOS 38, Ifrapon® AOS 38 P, Jeenate® AOS-40, Nikkol® OS-14, Norfox® ALPHA XL, POLYSTEP® A-18, Rhodacal® A-246L, Rhodacal® LSS-40/A
  Sulfonated oil, such as Turkish red oil
  Olefin sulfonates Aromatic sulfonates, such as Nekal®BX, Dowfax® 2A1

A sulfate is a compound that comprises at least one $SO_4$-group in the molecule. Examples of sulfates are:
- Fatty acid alcohol sulfates, such as coco fatty acid alcohol sulhphate (CAS 97375-27-4), e.g. EMAL®10G, Dispersogen®SI, Elfan® 280, Mackol® 100N
- Other alcohol sulfates, such as Emal® 71, Lanette® E
- Coco fatty acid alcohol ether sulfates, such as EMAL® 20C, Latemul® E150, Sulfochem® ES-7, Texapon® ASV-70 Spec., Agnique SLES-229-F, Octosol 828, POLYSTEP® B-23, Unipol® 125-E, 130-E, Unipol® ES-40
- Other alcohol ether sulfates, such as Avanel® S-150, Avanel® S 150 CG, Avanel® S150 CG N, Witcolate® D51-51, Witcolate® D51-53.

A phosphate is a compound that comprises at least one $PO_4$-group in the molecule. Examples of phosphates are:
- Alkyl ether phosphates, such as Maphos® 37P, Maphos® 54P, Maphos® 37T, Maphos® 210T, Maphos® 210P
- Phosphates such as Lutensit A-EP
- Alkyl phosphates The anionic surfactants are preferable added to salt. Salts are preferably alkaline metal salts, such as sodium, potassium, lithium, ammonium, hydroxylethyl ammonium, di(hydroxyethyl) ammonium and tri(hydroxyethyl) ammonium salts or alkanol amine salts.

Cationic surface-active compounds comprise dialkyl benzene alkyl ammonium chloride, alkyl benzyl methyl ammonium chloride, alkyl benzyl dimethyl ammonium bromide, benzalkonium chloride, cetyl pyridinium bromide, $C_{12}$, $C_{15}$, or $C_{17}$ trimethyl ammonium bromides, halide salts of quaternary polyoxy-ethylalkyl amines, dodecyl benzyl triethyl ammonium chloride and benzalkonium chloride.

Examples of cationic surfactants are also: quaternary ammonium compounds. A quaternary ammonium compound is a compound, that comprises at least one $R_4N^+$-group in the molecule. Examples of counter ions that can be used in quaternary ammonium compounds are:
- Halogen, methosulfates, sulfates and carbonates of coco fat or cetyl/oleyl trimethyl ammonium.

Preferably, the following cationic surfactants are used:
- N,N-dimethyl-N-(hydroxy-$C_7$-$C_{25}$-alkyl) ammonium salts
- Mono- and di($C_7$-$C_{25}$-alkyl) dimethyl ammonium compounds
- Ester quats, especially mono-, di- and trialkanol amines, quaternary esterificated with $C_8$-$C_{22}$ carboxylic acids.
- Imidazolin quats, especially 1-alkylimidazolinium salts.

A betain surfactant is a compound that, under conditions of use, comprises at least one positive charge and at least one negative charge. An alkyl betain is a betain surfactant that comprises at least one alkyl unit per molecule. Examples of betain surfactants are:
- Cocamidopropylbetain, such as MAFO® CAB, Amonyl® 280BE, Amphosol® CA, Amphosol® CG, Amphosol® CR, Amphosol® HCG, Amphosol® HCG-50, Chembetaine® C, Chembetaine® CGF, Chembetaine® CL, Dehyton® PK, Dehyton® PK 45, Emery® 6744, Empigen® BS/F, Empigen® BS/FA, Empigen® BS/P, Genagen® CAB, Lonzaine® C, Lonzaine® CO, Mirataine® BET-C-30, Mirataine® CB, Monateric® CAB, Naxaine® C, Naxaine® CO, Norfox® CAPB, Norfox® Coco Betaine, Ralufon® 414, TEGO®-Betain CKD, TEGO® Betain E KE 1, TEGO®-Betain F, TEGO®-Betain F 50, and aminoxides such as alkyl dimethyl amineoxide.

Non-ionic surfactants comprise polyvinyl alcohol, polyacrylic acid, methalose, methyl cellulose, ethyl cellulose, propyl cellulose, hydroxy ethyl cellulose, carboxymethyl cellulose, natural gum, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol.

Non-ionic surfactants have a neutral, polar and hydrophilic head that makes non-ionic surfactants water-soluble. Such surfactants adsorb at surfaces and aggregate to micelles above their critical micelle concentration. Depending on the type of head, different surfactants can be identified, such as (oligo)oxyalkylene groups, and especially (oligo)oxyethylene groups, (polyethylene)glycol groups and carbohydrate groups, such as alkyl polyglucosides and fatty acid N-methyl glucamides.

Alcohol phenolalkoxylates are compounds that can be produced through addition of alkylene oxide, preferably ethylene oxide, to alkyl phenols. Non-limiting examples are: Norfox® OP-102, Surfonic® OP-120, T-Det® O-12.

Fatty acid ethoxylates are fatty acid esters, that are treated with different amounts of ethylene oxide.

Triglycerides are esters of glycerol (glycerides), in which all three hydroxyl groups are esterificated with fatty acids. These can be modified with alkylene oxides. Fatty acid alcohol amides comprise at least one amide group with an alkyl group and one or two alkoxyl groups. Alkyl polyglycosides are mixtures of alkyl monoglucosides (alkyl-α-D- and -β-D-glucopyranoside with a small amount -glucofuranoside), alkyl diglucosides (-isomaltosides, -maltosides and others) and alkyloligoglucosides (-maltotriosides, -tetraosides and others).

Alkyl polyglycosides can non-limiting be synthesized with an acid catalysed reaction (Fisher reaction) of glucose (or starch) or n-butylglycosides with fatty acid alcohols. Further, also alkyl polyglycosides can be used as non-ionic surfactant. A non-limiting example is Lutensol® GD70. In addition, also non-ionic N-alkylated, preferably N-methylated, fatty acid amides can be used as surfactant.

Alcohol alkoxylates comprise a hydrophobic part with a chain length of 4 to 20 carbon atoms, preferably 6 to 19 C-atoms and more preferably 8 to 18 C-atoms, whereby the alcohol can be linear or branched, and a hydrophilic part that comprises alkoxylate units, such as ethylene oxide, propylene oxide and/or butylene oxide, with 2 to 30 repeating units. Non-limiting examples are: Lutensol® XP, Lutensol® XL, Lutensol® ON, Lutensol® AT, Lutensol® A, Lutensol® AO, Lutensol® TO.

Other examples of suitable surfactants are reported in US20110275738A1, U.S. Pat. No. 7,153,516B2, US20080274073A1 and U.S. Pat. No. 7,767,748B2, and are hereby included by reference.

In a preferred embodiment, the present invention provides a method for preparing a polyisobutene emulsion, wherein said wax is comprised in an amount of 0.01% wt. to 65% wt. relative to the total weight of said emulsion.

In a more preferred embodiment of the present invention, said wax is comprised in an amount between 1% wt. to 60% wt. relative to the total weight of said emulsion. More preferably, said wax is comprised in an amount between 10% wt. to 55% wt. relative to the total weight of said emulsion. Even more preferably, said wax is comprised in an amount between 15% wt. to 50% wt. relative to the total weight of said emulsion. Even more preferably, said wax is comprised in an amount between 20% wt. to 50% wt.

relative to the total weight of said emulsion. Most preferably, said wax is comprised in an amount of 22% wt., 24% wt., 26% wt., 28% wt., 30% wt., 32% wt., 34% wt., 36% wt., 38% wt., 40% wt., 42% wt., 44% wt., 46% wt., 48% wt., or any amount there in between relative to the total weight of said emulsion.

Suitable waxes include both natural and synthetic waxes. Suitable waxes include animal waxes, such as bees wax, Chinese wax, wax shellac, spermaceti and wool wax; vegetable waxes such as bayberry wax, palm wax, candelilla wax, carnauba wax, castor oil wax, asparto wax, Japanese wax, jojoba oil wax, ouricury wax, rice bran wax and soybean wax; mineral waxes such as ceresin waxes, montan wax, ozokerite wax and turf wax; petroleum waxes, such as paraffin and microcrystalline waxes, and synthetic waxes, such as polyolefin waxes, including polyethylene and polypropylene waxes, polytetrafluoroethylene waxes (PTFE wax), Fischer-Tropsch waxes, stearamide waxes (including ethylene-bis-stearamide waxes), polymerized α-olefin wax, substituted amide waxes (for example, esterified or saponified substituted amide waxes) and other chemically modified waxes, such as PTFE-modified polyethylene wax, as well as combinations of the above. Preferably these waxes include paraffin wax, microcrystalline wax, Fischer-Tropsch waxes, linear and branched polyethylene waxes, polypropylene waxes, carnauba wax, ethylene-bis-stearamide (EBS) wax and combinations thereof.

Other examples of suitable waxes are reported in US20110275738A1, U.S. Pat. No. 7,153,516B2, US20080274073A1 and U.S. Pat. No. 7,767,748B2, and are hereby included by reference.

One of the advantages of the above described method is to further reduce the tackiness and viscosity of the resulting polyisobutene emulsion.

In a preferred embodiment, the present invention provides a method for preparing a polyisobutene emulsion, wherein said oil is comprised in an amount of 0.01% wt. to 65% wt. relative to the total weight of said emulsion.

In a more preferred embodiment of the present invention, said oil is comprised in an amount between 1% wt. to 60% wt. relative to the total weight of said emulsion. More preferably, said oil is comprised in an amount between 10% wt. to 55% wt. relative to the total weight of said emulsion. Even more preferably, said oil is comprised in an amount between 15% wt. to 50% wt. relative to the total weight of said emulsion. Even more preferably, said oil is comprised in an amount between 20% wt. to 50% wt. relative to the total weight of said emulsion. Most preferably, said oil is comprised in an amount of 22% wt., 24% wt., 26% wt., 28% wt., 30% wt., 32% wt., 34% wt., 36% wt., 38% wt., 40% wt., 42% wt., 44% wt., 46% wt., 48% wt., or any amount there in between relative to the total weight of said emulsion.

Suitable oils comprise both natural and mineral oils. Natural oils comprise e.g. soybean oil, olive oil, sesame oil, cotton seed oil, castor oil, coconut oil, canola oil and palm oil, mineral oils such as paraffinic and/or naphthenic oils and petroleum jelly.

Other examples of suitable oils are reported in US20110275738A1, U.S. Pat. No. 7,153,516B2, US20080274073A1 and U.S. Pat. No. 7,767,748B2, and are hereby included by reference.

In a preferred embodiment, the present invention provides a method for preparing a polyisobutene emulsion, further comprising the step of mixing water, polyisobutene and/or a composition comprising polyisobutene with at least one additive, said additive being comprised in an amount of 0.01% wt. to 10% wt. relative to the total weight of said emulsion.

In a more preferred embodiment, said additive is added in an amount of 0.01% wt. to 10% wt. Preferably, said additive is added in an amount of 0.05% wt. to 5% wt., more preferably of 0.1% wt. to 3% wt or any value there in between. Most preferably, the amount of additive to be used is dependent on the function of said additive and will be clear for the technical person skilled in the art.

Additives can have a positive influence on the production process of the emulsion, and may provide certain desired characteristics to the emulsions. An example of possibly used additives are, inter alia, bases to optimize the saponification process, as well as bactericides, dyes, viscosity modifiers for increase or reduction of the viscosity, anti-foaming agents, de-foaming agents. It should be clear to one skilled in the art that these are just examples of possibly used additives, and that other options are also possible.

Other examples of suitable additives are reported in US20110275738A1, U.S. Pat. No. 7,153,516B2, US20080274073A1 and U.S. Pat. No. 7,767,748B2, and are hereby included by reference.

In a more preferred embodiment, said additive is selected from a group of additives used in chemical-technical applications, such as glue systems, cosmetic, plant protection, preparation and treatment of paper, production and processing of textiles and leather, coatings, pharmaceutical applications, construction, wood treatment, water and gas barrier for, e.g., methane, carbon dioxide, radon, protective coating for radio-active radiation; or additives having bacterial and/or microbiological activity.

In a preferred embodiment, the present invention provides a method for preparing a polyisobutene emulsion, further comprising the step of storing, transporting and/or treating polyisobutene and/or compositions comprising polyisobutene in at least one device provided with an organo-silicon coating at the interphase between said device and said polyisobutene or composition comprising polyisobutene.

In a more preferred embodiment, the equipment for the production of a polyisobutene emulsion according to the present invention comprises a production vessel or reactor, a homogeniser, a heat exchanger, storage tanks for raw materials, storage tanks for emulsion and a filter system.

Preferably, said production vessel is provided with a mixing device, said mixing device preferably being capable to ensure proper mixing of the emulsion at viscosities up to 5000 mPa·s without bringing a substantial amount of air in said emulsion and to ensure proper mixing during evacuation of the obtained emulsion from said production vessel. In addition, said production vessel or reactor is equipped with means for heat exchange to efficiently heat or cool the content of said reactor. Preferably, said means for heat exchange is a steam, hot water or cooling water coil. In addition, said production vessel is constructed using stainless steel. Preferably, said stainless steel is SS304L or SS316. Most preferably, said production vessel is constructed using stainless steel with a silicone coating at the contact surface. This provides the advantage of facilitating handling of a composition comprising polyisobutene, due to reduced tackiness of said composition comprising polyisobutene. In addition, said production vessel is provided with means for entering liquids, such as waxes, oils, additives and with recycling pipes, air outlets, evacuation pipes, means for pressure and temperature measurement, etc.

Preferably, said homogeniser is connected to a pump for feeding of a composition comprising polyisobutene. Preferably, said pump is a centrifugal or a volumetric pump. More preferably, said centrifugal pump has a capacity higher than 5.000 l per hour, ensuring a pressure higher than 1 bar. Preferably, said homogenisation phase comprises two stages or steps, hereinafter referred to as a $1^{st}$ stage and a $2^{nd}$ stage or a high pressure stage and a low pressure stage, respectively. Preferably, the outlet of said homogeniser comprises:
  i. a valve with connection to a heat exchanger for discharging said emulsion from the homogeniser, and/or
  ii. a valve with connection suited for further processing said emulsion and/or pre-emulsion by:
    a. recycling the composition comprising polyisobutene to the reactor or production vessel of that homogeniser, or
    b. further processing the composition comprising polyisobutene in a next homogeniser.

Preferably, said homogeniser is a high pressure homogeniser suitable for the preparation of emulsions with an average particle size in the range of several μm, thereby enhancing the stability of said emulsion. In such a homogeniser, a pre-mix or pre-emulsion is pressurized at a pressure between 50 bar and 2000 bar and subsequently sent through a small channel, thereby enhancing the velocity of said mixture and decreasing the pressure of said mixture and consequently creating friction forces, turbulence and cavitation. After passing the channel, pressure is again enhanced and the velocity decreased. Thereby, the particles are split and the average particle size decreases substantially, thereby enhancing the stability of the obtained emulsion. The emulsion or pre-emulsion can thus be processed repeatedly, thereby further reducing the average particle sized of said emulsion.

Preferably, said heat exchanger is a pipe or plate heat exchanger. In addition, said heat exchanger is preferably connected with the cooling liquid in reverse current. Preferably, said heat exchanger is provided with a cooling spiral, preferably from a metal such as, but not limited to, copper.

Preferably, storage tanks for wax or oil are constructed from steel. Storage tanks for aqueous phases comprising additives are preferably constructed from stainless steel or coated metal, whereby said coated metal is e.g., but not limited to, an epoxy coated metal.

Preferably, the filter system comprises two filter housings constructed in e.g. stainless steel, such as, but not limited to, SS304L or SS316, with a stainless steel filter with a filter size of less than 2000 μm, more preferably between 100 μm and 1000 μm, even more preferably of 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm or 950 μm, most preferably of 800 μm. Preferably, said filter system is constructed in a silicone coated material, whereby said silicone coating is preferably based on an organosilicon polymer.

In a preferred embodiment, the present invention provides a method for preparing a polyisobutene emulsion, further comprising the step of controlling temperature, pressure, stir rate and/or flow rate of water, polyisobutene, pre-mix, pre-emulsion and/or emulsion within the range of 50% of the value of a predetermined process parameter.

In a more preferred embodiment, said temperature, pressure, stir rate and/or flow rate of water, polyisobutene, pre-mix, pre-emulsion and/or emulsion are controlled within the range of 40% of the value of a predetermined process parameter. Preferably, temperatures, pressures, stir rates and/or flow rates of water, polyisobutene, pre-mix, pre-emulsion and/or emulsion are controlled within the range of 35% of the value of a predetermined process parameter. Preferably, temperatures, pressures, stir rates and/or flow rates of water, polyisobutene, pre-mix, pre-emulsion and/or emulsion are controlled within the range of 30% of the value of a predetermined process parameter. More preferably, temperatures, pressures, stir rates and/or flow rates of water, polyisobutene, pre-mix, pre-emulsion and/or emulsion are controlled within the range of 25% of the value of a predetermined process parameter. Even more preferably, temperatures, pressures, stir rates and/or flow rates of water, polyisobutene, pre-mix, pre-emulsion and/or emulsion are controlled within the range of 20% of the value of a predetermined process parameter. Most preferably, temperatures, pressures, stir rates and/or flow rates of water, polyisobutene, pre-mix, pre-emulsion and/or emulsion are controlled within the range of 18%, 16%, 14%, 12%, 10%, 8%, 6%, 4%, 2%, 1%, 0.1%, 0.01%, or any value there in between of the value of a predetermined process parameter.

One of the advantages of the above described method is that the quality of the emulsion obtained by the above described method is relatively constant, thereby providing different batches of emulsion with consistent chemical and physical characteristics or thereby providing an emulsion output from a continuous emulsion preparation process with consistent chemical and physical characteristics.

In a preferred embodiment, the present invention provides a method for preparing a polyisobutene emulsion, further comprising the step of controlling the amount of water in said pre-mix, said pre-emulsion and/or emulsion within the range of 50% of the predetermined amount of water in said emulsion.

In a more preferred embodiment, the present invention provides a method for preparing a polyisobutene emulsion, further comprising the step of controlling the amount of water in said pre-emulsion and/or in said emulsion within the range of 40% of the predetermined amount of water in said emulsion. Preferably, the amount of water in said pre-mix, said pre-emulsion and/or emulsion is controlled within the range of 35% of the predetermined amount of water in said emulsion. Preferably, the amount of water in said pre-mix, said pre-emulsion and/or emulsion is controlled within the range of 30% of the predetermined amount of water in said emulsion. More preferably, the amount of water in said pre-mix, said pre-emulsion and/or emulsion is controlled within the range of 25% of the predetermined amount of water in said emulsion. Even more preferably, the amount of water in said pre-mix, said pre-emulsion and/or emulsion is controlled within the range of 20% of the predetermined amount of water in said emulsion. Most preferably, the amount of water in said pre-mix, said pre-emulsion and/or emulsion is controlled within the range of 18%, 16%, 14%, 12%, 10%, 8%, 6%, 4%, 2%, 1%, 0.1%, 0.01%, or any value there in between of the predetermined amount of water in said emulsion.

One of the advantages of the above described method is that the quality of the emulsion obtained by the above described method is relatively constant, since a good dispersion of pre-mix in the aqueous phase can be guaranteed by assuring a sufficient amount of water, since water partially evaporates during the process of emulsifying, thereby providing different batches of emulsion with consistent chemical and physical characteristics or thereby providing an emulsion output from a continuous emulsion preparation process with consistent chemical and physical characteristics.

In a preferred embodiment, the present invention provides a method for preparing a polyisobutene emulsion, wherein homogenising said pre-emulsion in a homogeniser comprises at least one phase comprising two steps, said steps being:
- a $1^{st}$ homogenisation step at a pressure between 50 bar and 5000 bar, and
- a $2^{nd}$ homogenisation step at a pressure between 5 bar and 500 bar.

In a more preferred embodiment, homogenisation occurs in at least one phase. In a first phase, the pressure in the first step is between 100 bar and 500 bar, more preferably between 150 bar and 400 bar, even more preferably between 200 bar and 300 bar, most preferably of 200 bar, 210 bar, 220 bar, 230 bar, 240 bar, 250 bar, 260 bar, 270 bar, 280 bar, 290 bar or 300 bar, or any pressure there in between. In said first phase, the pressure in the second step is between 10 bar and 50 bar, more preferably between 15 bar and 40 bar, even more preferably between 20 bar and 30 bar, most preferably of 20 bar, 21 bar, 22 bar, 23 bar, 24 bar, 25 bar, 26 bar, 27 bar, 28 bar, 29 bar or 30 bar, or any pressure there in between.

In a preferred embodiment, the present invention provides a method for preparing a polyisobutene emulsion, further comprising at least one additional homogenisation phase at a pressure higher than the first phase.

In a second phase, the pressure in the first step is preferably between 100 bar and 500 bar, more preferably between 150 bar and 400 bar, even more preferably between 200 bar and 300 bar, most preferably of 200 bar, 210 bar, 220 bar, 230 bar, 240 bar, 250 bar, 260 bar, 270 bar, 280 bar, 290 bar or 300 bar, or any pressure there in between. In said second phase, the pressure in the second step is between 10 bar and 50 bar, more preferably between 15 bar and 40 bar, even more preferably between 40 bar and 70 bar, most preferably of 40 bar, 45 bar, 50 bar, 55 bar, 60 bar, 65 bar or 70 bar, or any pressure there in between. In a third phase, the pressure in the first step is preferable between 250 bar and 5000 bar, more preferably between 300 bar and 1000 bar, even more preferably between 350 bar and 650 bar, most preferably of 360 bar, 380 bar, 400 bar, 420 bar, 440 bar, 460 bar, 480 bar, 500 bar, 520 bar, 540 bar, 560 bar, 580 bar, 600 bar, 620 bar or 640 bar, or any pressure there in between. In said third phase, the pressure in the second step is between 25 bar and 500 bar, more preferably between 30 bar and 100 bar, even more preferably between 35 bar and 65 bar, most preferably of 35 bar, 40 bar, 45 bar, 50 bar, 55 bar, 60 bar or 65 bar, or any pressure there in between.

Preferably, the described method comprises a $4^{th}$, $5^{th}$, $6^{th}$, $7^{th}$, $8^{th}$, $9^{th}$, $10^{th}$, etc. phase in order to further reduce the average particle size of the thereby obtained emulsion.

In a more preferred embodiment, homogenisation in a phase occurs in a time span between 1 minute and 8 hours for each phase individually. More preferably, each phase occurs in a time span between 5 minutes and 2 hours for each phase individually. More preferably, each phase occurs in a time span between 15 minutes and 1 hour for each phase individually, most preferably in a time span of 16 minutes, 18 minutes, 20 minutes, 22 minutes, 24 minutes, 26 minutes, 28 minutes, 30 minutes, 32 minutes, 34 minutes, 36 minutes, 38 minutes, 40 minutes, 42 minutes, 44 minutes, 46 minutes, 48 minutes, 50 minutes, 52 minutes, 54 minutes, 56 minutes, 58 minutes or 60 minutes, or any time span there in between.

In a preferred embodiment, the present invention provides a method for preparing a polyisobutene emulsion, wherein heating, cooling and/or mixing of polyisobutene, a wax, an oil and/or water, and/or homogenising and/or cooling said pre-mix, pre-emulsion and/or emulsion is carried out inline.

Some advantages provided by inline treatment of said compounds are that i) the solving process for dissolving e.g. surfactants, oils, waxes, additives, etc. is much faster and more qualitative with a better homogeneous distribution in the dissolving phase, ii) polyisobutene is much faster and much better dispersed in the aqueous phase, iii) the surfactant is much better distributed at the interphase between aqueous and polyisobutene phase, iv) the homogenisation process is much faster, v) heat transfer during heating and/or cooling processes is much more energetically advantageous, and vi) the mixing time needed to mix compounds is significantly reduced.

Preferably, the desired emulsion is prepared in a continuous, single-pass manner. This minimizes production time, and it also ensures that the product quality will be consistent. The high efficiency available with state-of-the-art homogenisers is usually sufficient to permit the implementation of such a process.

However, some products cannot be manufactured in a single pass. Such products must be homogenised for additional passes to achieve the desired product quality.

One method for the preparation of a polyisobutene emulsion is to operate the appropriate number of homogenizers in series. This produces reliable results, but it also requires a large initial investment in equipment.

A second method for the preparation of a polyisobutene emulsion involves a single homogenizer and two tanks and feed pumps. A pre-mix would be prepared in one tank, and the first pass of homogenized product would be collected in the second tank. By means of a suitable valve arrangement, the material in the second tank will then be fed back to the homogenizer, and the two-pass material will be collected back into the first tank. This cycle is repeated, until the required number of homogenizing passes has been completed. Such a system requires a smaller investment in equipment, but there is some uncertainty that the entire product has undergone the total number of passes. On each pass there will be some product left in the feed tank, pump and pipelines, which was not homogenized during that pass. However, such effects are relatively small and are usually ignored.

In a preferred embodiment, the present invention provides a method for the preparation of a polyisobutene emulsion, wherein homogenising said pre-emulsion is carried out in a multiple-pass homogenisation device for continuous recycling.

In a more preferred embodiment, the present invention discloses a method which involves one well-agitated kettle and one homogenizer. The discharge from the homogenizer is piped back to the kettle, and the product is continuously recycled, until the required number of passes has been completed.

Once the emulsion is formed, the homogenization process will be stopped and the emulsion is to be cooled. Preferably, the emulsion is cooled to the desired end temperature ranging from 20° C. to 40° C., preferably from 20 to 25° C. It is extremely important that this cooling process is carried out as efficiently as possible because the speed at which the emulsion is cooled down has an impact on the quality of the resulting emulsion. The faster the cooling to a desired temperature can be accomplished, the higher the quality of the resulting emulsion. Furthermore, it is economically advantageous to promote the production of the emulsions as efficiently and quickly as possible.

Preferably, said emulsion is cooled at a rate of at least 0.1° C. per minute. More preferably, said emulsion is cooled at a rate of at least 0.5° C. per minute. Even more preferably, said emulsion is cooled at a rate of at least 1° C. per minute. Most preferably, said emulsion is cooled at a rate of at least 5° C. per minute.

The composition and method as described above, lead to stable emulsions with very fine particles. The viscosity can vary from thin liquid emulsions (see also Examples 1-3 and 5-9) to highly viscous emulsions (see Example 4). These emulsions are suitable for applications, such as gluing systems, cosmetic, plant protection, preparation and treatment of paper, production and processing of textiles and leather, coatings, pharmaceutical applications, construction, wood treatment, water and gas barrier for e.g. methane, carbon dioxide, radon, protected coating for radioactive radiation.

EXAMPLES

In what follows, the invention is described using non-limiting examples which illustrate the invention, and which are not intended nor can be interpreted to limit the scope of the invention.

Below are some examples. The values in the table represent the mass ratios.

(*) The stability test is carried out by acceleration in a centrifuge, so that an accelerated aging treatment occurs in the emulsion. When $H_2O$ separation is lower than 35%, a stability of at least 6 months is guaranteed.

(**) The particle size distribution is determined using a Beckman Coulter LS 13 320 laser diffractometer MW.

Example 1

In a first example, compounds are weighed according to the amounts stated in Table 1.

TABLE 1

Amount and type of compounds used for the preparation of an emulsion according to example 1.

| | |
|---|---|
| Oppanol B30 | 250 |
| Stearic acid | 20 |
| Diethanol amine | 9 |
| Paraffin wax, melting point 60° C. | 220 |
| Biocide | 1 |
| Water | 500 |

220 grams of paraffin wax with a melting point of 60° C. is administered to a round-walled vessel without any baffles. Said vessel comprising said paraffin is heated to 140° C. using a heating plate. Said vessel is provided with a mixing device and the stirring rate is set at 400 rpm.

250 grams of Oppanol B30 is cut in small pieces of a maximum weight of 3 grams and is administered gradually to said vessel comprising said paraffin such that Oppanol B30 does not coagulate. Viscosity of the mixture of paraffin with Oppanol B30 is monitored until constant, thereby obtaining a pre-mix. Then, the pre-mix is cooled down to 70° C. to 80° C.

A homogeniser is preheated by purging with hot water (80° C.) for 30 minutes. Said water is evacuated and 500 grams of water (70° C.-80° C.) is administered to the reactor. Water is added to the emulsion during the preparation in order to keep the total amount of water within the range of the original mass of water ±5% wt. to compensate the loss of water due to evaporation. Said reactor is provided with a mixing device and the stirring rate is set at 600 rpm.

Subsequently, 20 grams of stearic acid and 10 grams of diethanol amine is administered to the reactor comprising water (70° C.-80° C.).

Homogenisation is started in recycling with a pressure setting in a first phase in the $1^{st}$ step at 250 bar and in the $2^{nd}$ step at 20 bar.

Said pre-mix (70° C.-80° C.) is steadily administered to the stirred water in the vortex over a time span of 2 minutes to 20 minutes. The average particle size of the emulsion is monitored. Homogenisation in the first phase takes 30 to 60 minutes. Homogenisation in a second phase takes place at 350 bar in the $1^{st}$ step and at 30 bar in the $2^{nd}$ step. The average particle size of the emulsion is monitored. Homogenisation in the second phase takes about 30 to 60 minutes. Homogenisation in a third phase takes place at 500 bar in the $1^{st}$ step and at 50 bar in the $2^{nd}$ step. The average particle size of the emulsion is monitored. Homogenisation in the third phase takes about 30 to 60 minutes.

Finally, the emulsion is cooled down to room temperature, thereby obtaining a polyisobutene emulsion with physical properties as described in Table 2.

Viscosity of the obtained emulsion is determined using a Brookfield viscometer (LV-2) at 100 rpm at room temperature (20° C.).

Stability of the emulsion is determined by the percentage of water separation in a stability-by-centrifugation method. In this method, a test cylinder with volume marks is filled with 10 mL of a homogenised test emulsion. The test cylinder with emulsion is placed in a centrifuge for 60 minutes and treated at a speed of 2300G. The average particle size and the particle size distribution of the emulsion is determined using a Beckman-Coulter LS13 320 Laser Diffraction Particle Size Analyser with Universal Liquid Module.

TABLE 2

Selected physical properties of the emulsion according to example 1.

| | |
|---|---|
| Solid content (%) | 51.87 |
| Density | 0.9413 g/ml |
| Brookfield viscosity (LV-2, 100 rpm) | 199.2 mPa · s |
| Stability (*) (% $H_2O$ separation) | 4 |

In an analogous way, the following emulsions are obtained.

Example 2

TABLE 3

Amount and type of compounds used for the preparation of an emulsion according to example 2.

| | |
|---|---|
| Glissopal V1500 | 465.9 |
| Stearic acid | 17.7 |
| Diethanol amine | 7 |
| Steareth-10 | 8.4 |
| Biocide | 1 |
| Water | 500 |

TABLE 4

Selected physical properties of the emulsion according to example 2.

| | |
|---|---|
| Solid content (%) | 50.13 |
| Density | 0.9417 g/ml |
| Brookfield viscosity (LV-2, 100 rpm) | 82.2 mPa · s |
| Stability (*) (% $H_2O$ separation) | 8 |

Example 3

TABLE 5

Amount and type of compounds used for the preparation of an emulsion according to example 3.

| | |
|---|---|
| Glissopal V640 | 599 |
| Polysorbate 40 | 15 |
| Polysorbate 60 | 15 |
| Biocide | 1 |
| Water | 370 |

TABLE 6

Selected physical properties of the emulsion according to example 3.

| | |
|---|---|
| Solid content (%) | 63.13 |
| Density | 0.9106 g/ml |
| Brookfield viscosity (LV-2, 100 rpm) | 225 mPa · s |
| Stability (*) (% $H_2O$ separation) | 10 |

Example 4

TABLE 7

Amount and type of compounds used for the preparation of an emulsion according to example 4.

| | |
|---|---|
| Oppanol B15 | 160.3 |
| Stearic acid | 17.7 |
| Diethanol amine | 14 |
| Tamol NH7519 | 5.3 |
| Polyvinyl alcohol | 20 |
| Biocide | 1 |
| Carnauba wax | 40 |
| Paraffin wax, melting point 60° C. | 241.7 |
| Water | 500 |

TABLE 8

Selected physical properties of the emulsion according to example 4.

| | |
|---|---|
| Solid content (%) | 49.4 |
| Density | 0.9315 g/ml |
| Brookfield viscosity (LV-2, 100 rpm) | 1193 mPa · s |
| Stability (*) (% $H_2O$ separation) | <0.5% |

TABLE 9

Amount and type of compounds used for the preparation of an emulsion according to examples 5-9.

| Example | Polyolefin | Surfactants | Water | Wax/oil | Additives |
|---|---|---|---|---|---|
| Example 5 | Glissopal V190 47% wt. | Sodium alkyl benzeen sulfonate 2.2% wt. | 50.5% wt. | none | Protectol HT (biocide) 0.1% wt. Sudan III, C.I. 26100 (colorant) 0.1% wt. Anti-foam concentrate (anti-foaming agent) 0.1% wt. |
| Example 6 | Oppanol B30 20% wt. | Polysorbate 40 1.5% wt. Polysorbate 60 1.5% wt. | 46.9% wt. | F-T wax, melting point 60° C. 30% wt. | Mergal K9N (biocide) 0.1% wt. |
| Example 7 | Oppanol B15 27.8% wt. | Stearic acid 2% wt Diethanol amine 1% wt. | 50% wt. | Mineral oil, viscosity 60 cSt at 40° C. 19.2% wt. | none |
| Example 8 | Oppanol B10 40% wt. | Stearic acid 1% wt Diethanol amine 0.5% wt. Steareth-10 1.5% wt. | 50% wt. | Luwax OA (polyethylene wax) 7% wt. | none |
| Example 9 | Oppanol B50 7% wt. | Steareth-10 1.5% wt. Nonoxynol-9 1.5% wt. | 60% wt. | Paraffin wax, melting point 55° C. 29.9% wt. | Mergal K9N (biocide) 0.1% wt. |

% wt. = % by weight = percentage by weight

It is understood that the current invention is not limited to the examples described herein and that adjustments or changes at the described examples can be added without re-evaluating the claims.

What is claimed is:

1. A method for preparing a polyisobutene emulsion comprising the steps of:
   heating a medium and/or high molecular weight polyisobutene polymer, optionally mixing said polyisobutene polymer with a wax and/or oil, thereby obtaining a pre-mix,
   mixing said pre-mix in water comprising one or more surfactants in a concentration of said one or more surfactants of at maximum 5% wt. to a polyisobutene polymer concentration of between 25% wt. and 65% wt. at a controlled flow rate, which flow rate is sufficiently slow to form particles of the pre-mix, thereby obtaining a pre-emulsion, and
   homogenising said pre-emulsion, thereby obtaining said polyisobutene emulsion with an average particle size of at maximum 100 μm.

2. A method according to claim 1, wherein said polyisobutene polymer is mixed with wax, oil, water or any mixture thereof at a flow rate of at maximum 50 grams of polyisobutene per 100 grams of wax, oil, water or any mixture thereof per minute.

3. A method according to claim 1, wherein said emulsion is homogenised in at least one homogenisation stage, thereby obtaining a polyisobutene emulsion with an average particle size between 1 nm and 75 μm.

4. A method according to claim 1, wherein said water is comprised in an amount of 0.5% wt. to 75% wt. relative to the total weight of said emulsion.

5. A method according to claim 1, wherein said one or more surfactants are comprised in a concentration between 0.1% wt. and 5% wt.

6. A method according to claim 1, wherein said wax is comprised in an amount of 0.01% wt. to 65% wt. relative to the total weight of said emulsion.

7. A method according to claim 1, wherein said oil is comprised in an amount of 0.01% wt. to 65% wt. relative to the total weight of said emulsion.

8. A method according to claim 1, further comprising the step of mixing water, polyisobutene and/or a composition comprising polyisobutene with at least one additive, said additive being comprised in an amount of 0.01% wt. to 10% wt. relative to the total weight of said emulsion.

9. A method according to claim 1, further comprising the step of storing, transporting and/or treating polyisobutene and/or compositions comprising polyisobutene in at least one device provided with an organosilicon coating at the interphase between said device and said polyisobutene or composition comprising polyisobutene.

10. A method according to claim 1, wherein homogenising said pre-emulsion in a homogeniser comprises at least one phase comprising two steps, said steps being:
    a $1^{st}$ homogenisation step at a pressure between 50 bar and 5000 bar, and
    a $2^{nd}$ homogenisation step at a pressure between 5 bar and 500 bar.

11. A method according to claim 10, further comprising at least one additional homogenisation phase at a pressure higher than said first phase.

12. A method according to claim 1, wherein heating, cooling and/or mixing of polyisobutene, a wax, an oil and/or water, and/or homogenising and/or cooling said pre-mix, pre-emulsion and/or emulsion is carried out inline.

13. A method according to claim 1, wherein homogenising said pre-emulsion is carried out in a multiple-pass homogenisation device for continuous recycling.

14. A method according to claim 1, wherein said pre-mix is mixed in water comprising one or more surfactants in a concentration of said one or more surfactants of at maximum 5% wt. to a polyisobutene polymer concentration of between 30% wt. and 65% wt.

* * * * *

UNITED STATES PATENT AND TRADEMARK OFFICE
CERTIFICATE OF CORRECTION

PATENT NO. : 9,617,443 B2
APPLICATION NO. : 14/414681
DATED : April 11, 2017
INVENTOR(S) : Lieve Taets It is certified that error appears in the above-identified patent and that said Letters Patent is hereby corrected as shown below:

On the Title Page

Item (30), (Foreign Application Priority Data) at Line 2, Change "13154995" to --13154996--.

In the Specification

In Column 8 at Line 55, Change "naphtalene" to --naphthalene--.

In Column 8 at Line 56, Change "lignine" to --lignin--.

In Column 9 at Line 5 (approx.), Change "sulhphate" to --sulphate--.

In Column 9 at Line 50, Change "betain" to --betaine--.

In Column 9 at Line 52, Change "betain" to --betaine--.

In Column 9 at Line 52, Change "betain" to --betaine--.

In Column 9 at Line 54, Change "betain" to --betaine--.

Signed and Sealed this
First Day of August, 2017

Joseph Matal
*Performing the Functions and Duties of the*
*Under Secretary of Commerce for Intellectual Property and*
*Director of the United States Patent and Trademark Office*